(12) United States Patent
Hohler et al.

(10) Patent No.: US 11,070,980 B1
(45) Date of Patent: Jul. 20, 2021

(54) SECONDARY DEVICE AUTHENTICATION PROXIED FROM AUTHENTICATED PRIMARY DEVICE

(71) Applicant: Sprint Communications Company L.P., Overland Park, KS (US)

(72) Inventors: Ricky A. Hohler, Olathe, KS (US); Robin D. Katzer, Louisburg, KS (US); Deepthi Kota, Overland Park, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 16/363,581

(22) Filed: Mar. 25, 2019

(51) Int. Cl.
*H04W 12/084* (2021.01)
*H04L 29/06* (2006.01)
*H04W 12/06* (2021.01)

(52) U.S. Cl.
CPC ....... *H04W 12/084* (2021.01); *H04L 63/0884* (2013.01); *H04W 12/06* (2013.01)

(58) Field of Classification Search
CPC .. H04W 12/084; H04W 12/06; H04L 63/0884
See application file for complete search history.

(56) References Cited

U.S. PATENT DOCUMENTS

| 8,847,915 | B2 | 10/2014 | Rodoper et al. |
| 2010/0208706 | A1 | 8/2010 | Hirano et al. |
| 2014/0282990 | A1 | 9/2014 | Engelhart |
| 2015/0319156 | A1 | 11/2015 | Guccione et al. |
| 2016/0344635 | A1 | 11/2016 | Lee et al. |
| 2017/0048697 | A1 | 3/2017 | Lundstrom |
| 2017/0093565 | A1 | 3/2017 | Yang et al. |
| 2017/0127276 | A1 | 5/2017 | Koo et al. |
| 2017/0250974 | A1* | 8/2017 | Antonyraj ............. H04L 9/3228 |
| 2018/0026973 | A1* | 1/2018 | Le Saint ............ G06F 21/6218 713/168 |
| 2018/0302781 | A1 | 10/2018 | Lee et al. |

(Continued)

OTHER PUBLICATIONS

Hohler, Ricky A., et al., "Mobile Phone client Application Authentication Through Media Access Gateway (MAG)", U.S. Appl. No. 15/912,521, filed Mar. 5, 2018.

(Continued)

*Primary Examiner* — Huan V Doan

(57) ABSTRACT

A method of authenticating a secondary communication device based on authentication of a primary mobile communication device is disclosed. Trust is established with the primary mobile communication device by a device authentication server (DAS). The DAS receives an authorization code request from a secondary application operating on the secondary communication device, and transmits an authorization code to the secondary communication device. The DAS receives the authorization code from a primary application operating on the primary mobile communication device. The DAS authorizes the secondary application based on the trust with the primary mobile communication device and the authorization code from the primary application. The DAS transmits a secondary token to the secondary application at the secondary communication device to allow initialization of a communication session from the secondary application on behalf of the primary mobile communication device.

8 Claims, 11 Drawing Sheets

(56) References Cited

U.S. PATENT DOCUMENTS

2018/0351943 A1 12/2018 Yasukawa et al.
2019/0380019 A1 12/2019 Buckley et al.

OTHER PUBLICATIONS

Holder, Ricky A., et al., "Server Application Access Authentication Based on SIM", U.S. Appl. No. 16/162,028, filed Oct. 16, 2018.
First Action Interview Pre-Interview Communication dated Mar. 27, 2020, U.S. Appl. No. 15/912,521, filed Mar. 5, 2018.
Notice of Allowance dated Apr. 29, 2020, U.S. Appl. No. 15/912,521, filed Mar. 5, 2018.
First Action Interview Pre-Interview Communication dated Jun. 10, 2020, U.S. Appl. No. 16/162,028, filed Oct. 16, 2018.
Notice of Allowance dated Aug. 19, 2020, U.S. Appl. No. 16/162,028, filed Oct. 16, 2018.

* cited by examiner

SECONDARY DEVICE AUTHENTICATION PROXIED FROM AUTHENTICATED PRIMARY DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may comprise a subscriber identity module (SIM) that securely stores authentication credentials for attaching to and communicating via a cellular wireless communication network. When a radio transceiver of the mobile communication device authenticates into a radio access network (RAN), it first obtains a copy of the authentication credentials from the SIM and then requests attachment to the RAN in a message comprising the authentication credentials. A SIM may be a removable smart card that comprises both non-volatile memory storing the authentication credentials and a logic processor able to execute instructions. The SIM may store one or more encryption key that is unique to this SIM and may provide encryption services to applications executing on the mobile communication device.

In some cases the mobile communication device comprises a SIM which is not removable (e.g., not removable by an ordinary user without damaging the mobile communication device), for example is connected to a motherboard of the mobile communication device. Such a SIM which is not removable may be referred to as an embedded universal integrated circuit card (UICC). An embedded UICC is substantially similar to a removable SIM in having non-volatile memory storing authentication credentials and one or more encryption key and having a logic processor.

SUMMARY

In an embodiment, a method of authenticating a secondary communication device based on authentication of a primary mobile communication device is disclosed. The method comprises establishing trust with the primary mobile communication device by a device authentication server (DAS). The method further comprises receiving, by the DAS, an authorization code request from a secondary application operating on the secondary communication device. The method further comprises transmitting, by the DAS, an authorization code to the secondary communication device in response to the authorization code request. The method further comprises receiving, by the DAS, the authorization code from a primary application operating on the primary mobile communication device. The method further comprises authorizing, by the DAS, the secondary application based on the trust with the primary mobile communication device and the authorization code from the primary application. The method further comprises transmitting a secondary token to the secondary application at the secondary communication device to allow initialization of a communication session from the secondary application on behalf of the primary mobile communication device.

In another embodiment, a method of authenticating a secondary communication device based on authentication of a primary mobile communication device is disclosed. The method comprises establishing trust with the primary mobile communication device by a DAS. The method further comprises receiving, by the DAS, an authorization code request from the primary mobile communication device via a mobile access gateway (MAG). The method further comprises transmitting, by the DAS, an authorization code to the primary mobile communication device in response to the authorization code request. The method further comprises receiving, by the DAS, the authorization code from a secondary application operating on the secondary communication device. The method further comprises authorizing, by the DAS, the secondary application based on the trust with the primary mobile communication device and the authorization code from the secondary application. The method further comprises transmitting an access token to the secondary application at the secondary communication device to allow initialization of a communication session from the secondary application on behalf of the primary mobile communication device.

In yet another embodiment, a primary mobile communication device is disclosed. The primary mobile communication device comprises a processor, a camera, a transceiver, and a non-transitory memory. The non-transitory memory stores a primary token indicating trust established between the primary mobile communication device and a DAS. The primary mobile communication device comprises a primary application, stored in non-transitory memory, that, when executed by the processor activates the camera to scan a Quick Response (QR) code from a secondary application at a secondary communication device. The primary application also transmits, via the transceiver, the QR code and the primary token to the DAS to indicate a physical *nexus* between the primary mobile communication device and the secondary communication device and to request extending the trust to include the secondary application at the secondary communication device on behalf of the primary mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
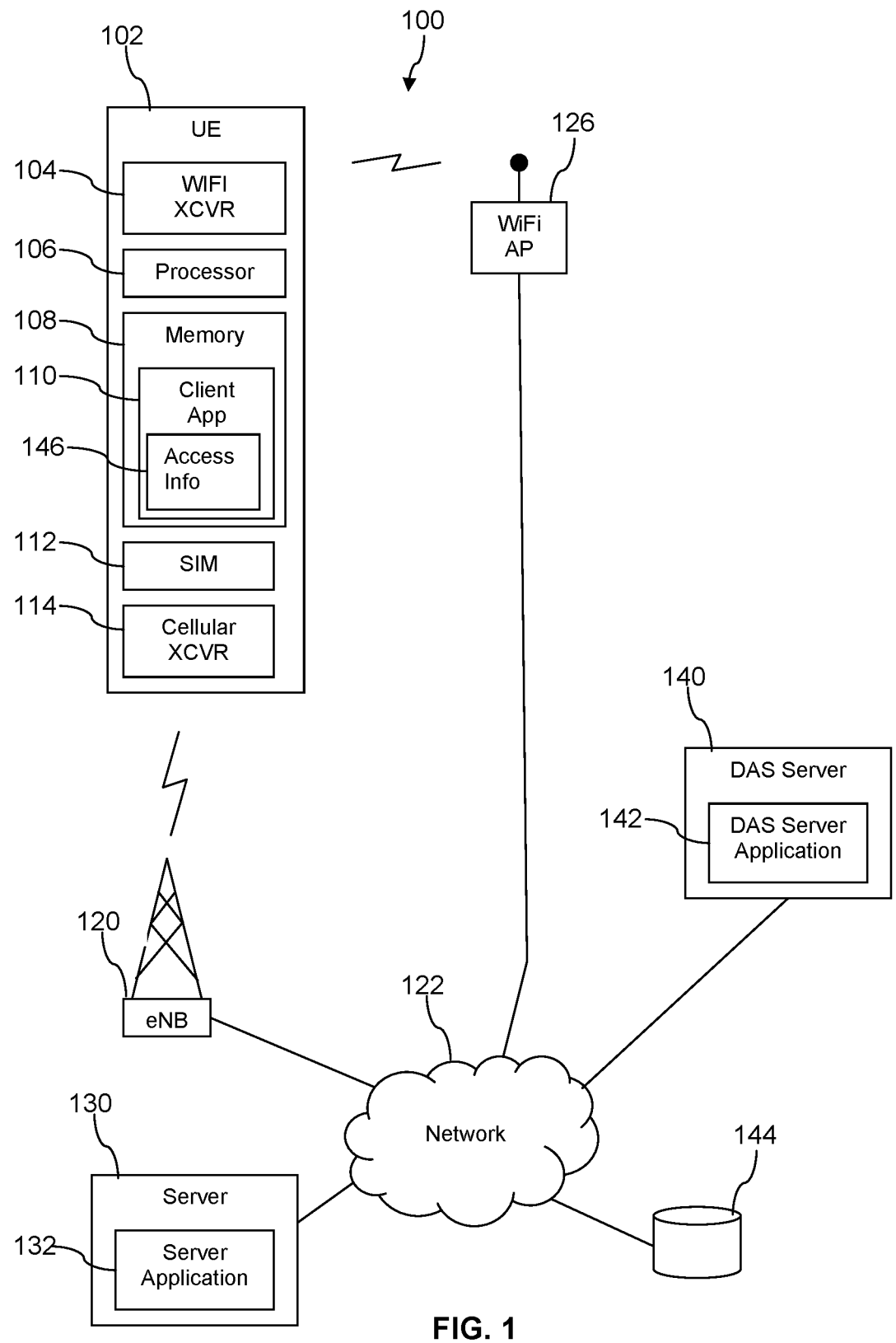
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network service providers wish to provide customers with appropriate access to a network while excluding access to unauthorized users. For example, a mobile telecommunications network may provide mobile telephone and/or mobile internet service to users. A service provider operating the mobile telecommunications network may wish to allow a user to remotely access their account, view bills, make account changes, etc. In some systems, authorized users can set up a username and/or password to access their account.

Unfortunately, many users use the same username and password combination across several unrelated platforms. When a security breach occurs on a platform, lists of usernames and passwords may be obtained by data thieves. Such thieves may then attempt to use the username and password combinations across multiple platforms in an attempt to gain access to users' accounts. Upon gaining entry, the thief may employ fraudulent access to make unauthorized charges on a user's account before the intrusion is discovered.

Such systems may contain additional vulnerabilities. For example, some systems allow users access on non-active accounts with the proper username and password combinations. Further, username and password systems may not employ three factor authentication, may not proactively monitor for security attacks, and may provide only inconsistent and segregated multi-layer security. Monitoring and troubleshooting in such systems may also include manual processes, and hence may by inconsistently managed.

In order to overcome such vulnerabilities, mobile telecommunication networks can be configured to establish a trust relationship with a particular mobile device. Trust based systems employ possession based security to protect customer data, limit exposure to liability, provide for proactive monitoring, and minimize user experience friction. A mobile telephone can be authenticated as belonging to a particular user using one of several possible mechanisms. Such a mobile device can then be trusted for later communications. For example, the authenticated mobile telephone can be provided with a token and/or be associated with a value that is specific to the authenticated mobile telephone. In some cases (e.g., when a SIM is present), the mobile telephone can provide the token/value to prove the trusted relationship upon attempting to access the network. In other cases (e.g., when a SIM is not used), the network can verify the mobile telephone is associated with a particular value, such as a mobile directory number (MDN) (e.g., telephone number), in order to prove trust. The mobile telephone may only be allowed to attempt to use a username/password login upon proving identity as a trusted device. When configured in this manner, a data thief is unable to prove their device is trusted. Hence, the data thief is not provided the opportunity to attempt a stolen username/password, which renders such username and password list useless for fraudulent purposes.

While such a system provides beneficial security features, many users wish to access their accounts using alternate devices. For example, a user may find using a mobile phone interface cumbersome when accessing their account. Such a user may instead wish to use an alternate device with a larger screen to access their account, such as a personal computer, a laptop computer, a tablet, etc. Providing access to approved alternative devices becomes problematic in a network that provides access based on previously established trust relationships.

The present disclosure teaches a system and method for extending trust established with a primary mobile communication device, such as a mobile phone, to a secondary communication device, such as a personal computer, laptop computer, tablet device, etc. Various mechanisms can be employed to authenticate a primary mobile communication device in order to establish and verify a trust relationship with the primary mobile communication device. In one example, a device authentication server (DAS) can employ mobile access gateway (MAG) authentication to authenticate a trust relationship with primary mobile communication device based on device MDN and provide an access token for use when accessing network applications. In another example, a DAS can employ an International Mobile Subscriber Identity (IMSI) encryption challenge to authenticate a trust relationship with primary mobile communication device by requiring the primary mobile communication device to encrypt a value with the IMSI of the SIM card employed by the device. In yet another example, a DAS can employ a self-identified IMSI mechanism to confirm the communication source as the primary mobile communication device.

Once a trust relationship is established with the primary mobile communication device, such trust can be extended to an approved secondary communication device. In one example, the secondary communication device sends a request to the DAS for an authentication code, such as a quick response (QR) code. The DAS associates the authentication code with the secondary communication device in memory and sends the authentication code to the secondary communication device. The primary mobile communication device obtains the authentication code from the secondary communication device and returns the authentication code to the DAS. This proves a physical nexus between the primary mobile communication device and the secondary communication device. The primary mobile communication device can also return a device name for the secondary communication device to the DAS along with a primary token/value provided to the primary mobile communication device during primary mobile communication device trust verification. The DAS can then authenticate the primary token and create an association list that associates a primary application on the primary mobile communication device with the authentication code, the secondary device name, and the primary token. The association list extends the trust with the primary mobile communication device to include the secondary communication device and/or an associated secondary application operating on the secondary communication device. The association list can be returned to the primary mobile communication device to notify the user of the addition of the secondary communication device. In some examples, the DAS can send a temporary access code to the secondary communication device to cause the secondary application to request authentication. Upon authentication, the DAS can forward an access token to the secondary communication device. However in other examples, the DAS can forward an access token to the secondary communication device upon addition of the secondary communication device. The access token can then be used by the secondary application/secondary communication device to initiate a communication session with the network on behalf of the primary mobile communication device.

In another example, the primary mobile communication device may be a so-called feature phone. A feature phone includes basic data connectivity, but may not include advanced smartphone functionality, such as cameras, web browsers, SIM chips, etc. Hence, the feature phone may be limited to communicating via a wireless access protocol (WAP). For example, the primary mobile communication device can send a WAP based request toward the DAS. A MAG can add the MDN of the primary mobile communication device to the WAP based request and forward the request to the DAS. The DAS can verify trust with the primary mobile communication device due to the MDN and forward an authentication code to the primary mobile communication device in a WAP page for display. The user can enter the authentication code into the secondary communication device for return to the DAS, and hence prove a physical nexus between the devices. The secondary communication device can also forward the MDN of the primary mobile communication device and a device name for the secondary communication device. The DAS can validate the authentication code from the secondary device based on the MDN and create an access token for the secondary communication device. The DAS can also create an association list to associate the access token and the secondary device name with the MDN of the primary mobile communication device. The association list extends the trust with the primary mobile communication device to include the secondary communication device and/or an associated secondary application operating on the secondary communication device. The DAS can then forward the access token and/or the association list to the secondary communication device. A secondary application operating on the secondary communication device can then employ the access token and/or the association list to initiate communication sessions with the network on behalf of the primary mobile communication device.

The preceding examples allow a secondary application operating on a secondary communication device to enter into secure communication sessions on behalf of a primary application operating on a trusted primary mobile communication device. These approaches prevent fraud by ensuring a user is in possession of a trusted device in order to access a corresponding account with the secondary communication device. Further, even if a data thief obtains possession of a trusted device, a security threat is limited to a particular user (and not a group of user accounts) because a particular trusted device only provides access to a single user account. Further, these approaches are generally network interface agnostic (except as required by a WAP operating on a feature phone). Hence, these approaches are functional for secondary communication devices that do not connect though a radio access network (RAN) of a mobile telecommunications network. Further, these approaches are operable for a primary mobile communication device even when the primary mobile communication device is not connected via the RAN (e.g., connected via an Institute of Electrical and Electronics Engineers (IEEE) 802.11 (WIFI) network).

It should be noted that the access tokens discussed herein are account specific. Hence, an access token provided to a primary application operating on a trusted primary mobile communication device and/or a secondary application operating on a secondary communication device provides such devices to a specific user's account. Such tokens may not provide access to an unrelated user account. As such, even if a data thief is able to obtain an access token for a particular user account (e.g., by stealing a physical telephone), such a token does not provide the thief access to other user accounts. Hence, the access tokens significantly limit the potential for malicious action by unauthorized individuals from the entire user account base to a small number of very specific cases. Also, it should be noted that access tokens for both the primary application on the primary mobile communication device and/or the secondary application on the secondary communication device may have a specified time to live. Hence, a user may be asked to reestablish trust and re-extend trust on a regular basis to obtain new access tokens. This further reduces the potential for malicious actions by unauthorized actors.

It should also be noted that disclosed embodiments also improve the hardware resource utilization of both the primary mobile communication device and the secondary communication device. For example, once trust is established with the secondary communication device (e.g., via access token and/or the association list), the primary mobile communication device need not be involved in further communication between the secondary communication device and the server. Hence, the primary mobile communication device can save processing resources, memory resources, and/or network communication resources once trust establishment with the secondary communication device is complete. Further, the secondary communication device can communicate directly with the server once trust establishment is complete. This may remove any need to tunnel through the connection of primary mobile communication device, which can save processing resources, memory resources, and/or network communication resources associated with such protocols. While the trust established with the secondary device may age out or expire periodically and call for reiteration of the above described process to reestablish trust with the secondary communication device, it will be appreciated that this still may achieve significant increases in processing and resource utilization efficiency. Turning now to FIG. 1, a communication system 100 is described. In an embodiment, the system 100 comprises a mobile communication device (user equipment—UE) 102 that comprises an optional WIFI radio transceiver 104, a processor 106, a memory 108, a subscriber identity module (SIM) 112, and a cellular radio transceiver 114. The memory 108 comprises a non-transitory memory portion that stores a client application 110. The mobile communication device 102 is one of a mobile phone, a smart phone, a feature phone, a personal digital assistant (PDA), a wearable computer, a headset computer, a laptop computer, a tablet computer, or a notebook computer. In an embodiment, the SIM 112 is an embedded universal integrated circuit card (UICC).

The system 100 further comprises a cell site 120 and a network 122. The cell site 120 is configured to establish a wireless communication link with the cellular radio transceiver 114 of the mobile communication device 102 according to a long term evolution (LTE), a code division multiple access (CDMA), a global system for mobile communications (GSM), or a worldwide interoperability for microwave access (WiMAX) wireless communication protocol. The network 122 may be one or more private networks, one or more public networks, or a combination thereof. The cell site 120 provides communication connectivity to the network 122 to the wireless communication device 102. In an embodiment, the system 100 further comprises a WIFI access point 126 that is configured to establish a wireless communication link with the WIFI radio transceiver 104 of the wireless communication device 102 and to provide communication connectivity to the network 122 to the wireless communication device 102.

The system 100 further comprises a server 130 that executes a server application 132, a device authentication server (DAS) server 140 that executes a DAS application 142, and a data store 144. The server 130 and the DAS server 140 may be implemented as computer systems. The data store 144 may be implemented, at least in part, as a computer system. Computer systems are described further hereinafter. The server 130, the DAS server 140, and the data store 144 are each communicatively coupled to the network 122. The system 100 may comprise any number of mobile communication devices 102, any number of cell sites 120, any number of WIFI access points 126, and any number of servers 130.

The client application 110 may request communication connectivity to the server application 132 to access services provided by the server application 132, for example to access an application programming interface (API) extended by the server application 132. To access the server application 132, the client application 110 may establish a trust relationship with the DAS server 140 and/or the DAS server application 142. The DAS server 140 then provides access information 146 to the client application 110. The client application 110 stores the access information 146 in the memory 108 for use in proving trust when communicating with server application 132. In an embodiment, the access information 146 is stored in a secure partition of the non-volatile portion of the memory 108, for example in a trust zone of the memory 108 or in a trust zone of the processor 106.

For example, the client application 110 may employ a MAG authorization process when communicating with the network 122 via a cell site 120. In the MAG authorization process, the client application 110 communicates with the DAS server 140 via a MAG in the network 122. The MAG is discussed in greater detail with respect to the FIGs. below. The MAG proxies the client application 110 by communicating with the DAS server 140 on behalf of the client application 110. Specifically, the MAG identifies the MDN of the wireless communication device 102 and passes the MDN to the DAS server application 142. The DAS server application 142 verifies the account associated with the wireless communication device 102, which establishes trust with the wireless communication device 102. The DAS server application 142 generates a nonce/password, stores the nonce/password in the data store 144, and forwards the nonce/password to the wireless communication device 102. The client application 110 can then use the nonce/password to request access information 146 (e.g., an access token) from the DAS server 140 and/or the DAS server application 142. The DAS server application 142 can then grant a trust relationship to the client application 110 based on the MDN of the wireless communication device 102 associated with the client application 110. The client application 110 may then employ the access information 146 to prove trust when communicating with server application 132.

In another example, the client application 110 may employ an IMSI encryption challenge process when communicating with the network 122. This approach allows the client application 110 to establish trust when communicating either via the cell site 120 or the WIFI access point 126. Specifically, the IMSI encryption challenge process does not require communication via the MAG, which may not be available when communicating via the WIFI access point 126. In this example, the client application 110 queries the IMSI of the SIM 112, and forwards the IMSI to the DAS server 140 and/or the DAS server application 142. The DAS server application 142 verifies that the IMSI is associated with a valid account and determines a set of keys associated with the SIM 112 as stored in the data store 144. The DAS server application 142 encrypts a random value with the keys used by the SIM 112 as stored in the data store 144. The DAS server application 142 also computes access information 146 in the form of an access key from the random value and the SIM 112 keys.

The DAS server application 142 forwards the random number to the client application 110, which forwards the random number to the SIM 112 for encryption. The client application 110 does not have access to the SIM 112 keys, and hence the client application 110 cannot be emulated on any device other than the wireless communication device 102 with the associated SIM 112. The SIM 112 encrypts the random number and computes the access information 146 with the SIM 112 keys, and forwards the encrypted random number and the access information 146 to the client application 110. The client application 110 stores the access information 146 and forwards the encrypted random number to the DAS server application 142 to establish a trust relationship. The DAS server application 142 verifies the previously encrypted random number with the encrypted random number received from the client application 110. If the encrypted random numbers match, the client application 110 has access to the correct SIM 112, and is trusted. The DAS server application 142 informs the client application 110 of successful authentication. The DAS server application 142 may also pass the access information 146 to server application 132. The client application 110 can then prove trust by encrypting further communications with server application 132 with the access information 146 (e.g. the access key).

In yet another example, the wireless communication device 102 may be a feature phone that includes a UICC instead of the SIM 112, and hence may be unable to employ the IMSI encryption challenge process in some examples. In this case, the wireless communication device 102 can employ a self-identified IMSI process. In this process, wireless communication device 102 employs a safety net attestation process and a safety net recaptcha process to confirm that the client application 110 has not been modified, that the client application 110 is operating on a physical device (the wireless communication device 102), the device has not been rooted, and the client application 110 is operated by a human user and not a bot program. In such a case, trust is established with the client application 110. In this example, the safety net attestation process causes the client application 110 to query the DAS server application 142 for a nonce value. The client application 110 employs the nonce value to query a SafetyNet Attestation application program interface (API) via the network 122.

The SafetyNet Attestation API returns a java script object notation (JSON) web signature (JWS) attestation indicating the identity of the wireless communication device 102. The client application 110 returns the signed response of this API call to the DAS server application 142. The DAS server application 142 verifies the signed response and then returns the result of the verification back to the client application 110. The contents of the signed response from the SafetyNet Attestation check allow the DAS server application 142 to confirm that the request originated from the client application 110 with a known package name and matching signature. Further, the contents of the signed response also allow the DAS server application 142 to confirm that the client application 110 is un-modified, operating on a physical device, and un-rooted. The client application 110 can then send a safety net recaptcha message to the SafetyNet Attestation API, which responds with a recaptcha user response token including an image for display to a user. If the user can verify characteristics of the image matches data in the response token, then the user is not a bot. The client application 110 forwards the recaptcha user response token, an attestation token, and the IMSI from the UICC/SIM 112 to the DAS server application 142. The DAS server application 142 validates such information with the SafetyNet Attestation API to verify that the previously discussed conditions are met. The DAS server application 142 can then establish trust with the client application 110 and forward access information 146 in the form of an access token. The client application 110 may then employ the access information 146 to prove trust when communicating with server application 132.

While FIG. 1 illustrates a single client application 110 having access information 146, it is understood that the client application authentication can advantageously be applied by multiple different client applications installed on the same mobile communication device 102 at the same time. Each different client application can obtain its own distinct access information 146 for validating by the DAS server application 142 before communicating with the server application 132. It is observed that the client application 110 can communicatively couple to the network 122 and to the server 130 either through a wireless link established by the cell site 120 or through a wireless link established by the WIFI access point 126.

Once a trust relationship has been established with the mobile communication device 102, a user can choose to extend this trust for use by devices that are not connected to a mobile phone carrier's radio access network, such as another carrier's device, a WiFi-only device, etc. The process for extending this trust is discussed with respect to the FIGs. below. The user can be allowed to view all trusted devices associated with their mobile communication device 102 and add/delete secondary devices as desired. Additions/deletions may trigger a notification, such as an email, to the primary user. The base level of trust with a mobile communication device 102 may allow the client application 110 to display certain components of a user's account and allow specific functionality based on the fact that the user has physical possession of the trusted device. For some operations, such as updating a billing address, trust escalation may be accomplished through second and/or third factor challenges to ensure the account is not compromised. A successful escalation of trust on a mobile communication device 102 may trigger a notification to the primary user.

On initial launch of the client application 110 on a mobile communication device 102, the client application 110 may first attempt to establish a primary trust relationship as described above. If this is not possible, then the client application 110 may prompt the user to extend trust to a new device from an already trusted device. If the trust extension fails, or if the user declines, then the user may be forwarded to a limited web view of a corresponding carrier website.

Meanwhile, the APIs for the server application 132 may only respond to requests from known primary/secondary trusted devices. By blocking requests from unknown/untrusted devices, bots are prevented from accessing the authentication/login APIs, as bots are unable to establish a trust relationship. If a trusted mobile communication device 102 were to become compromised, then the exposure would be limited to a single account. This is because the trusted mobile communication device 102 would not be able to access other accounts outside of the original trust relationship. If such a compromise is discovered, then the trust relationship can be cleared and/or blocked from the server 130 side to prevent further exposure.

Figure 2:
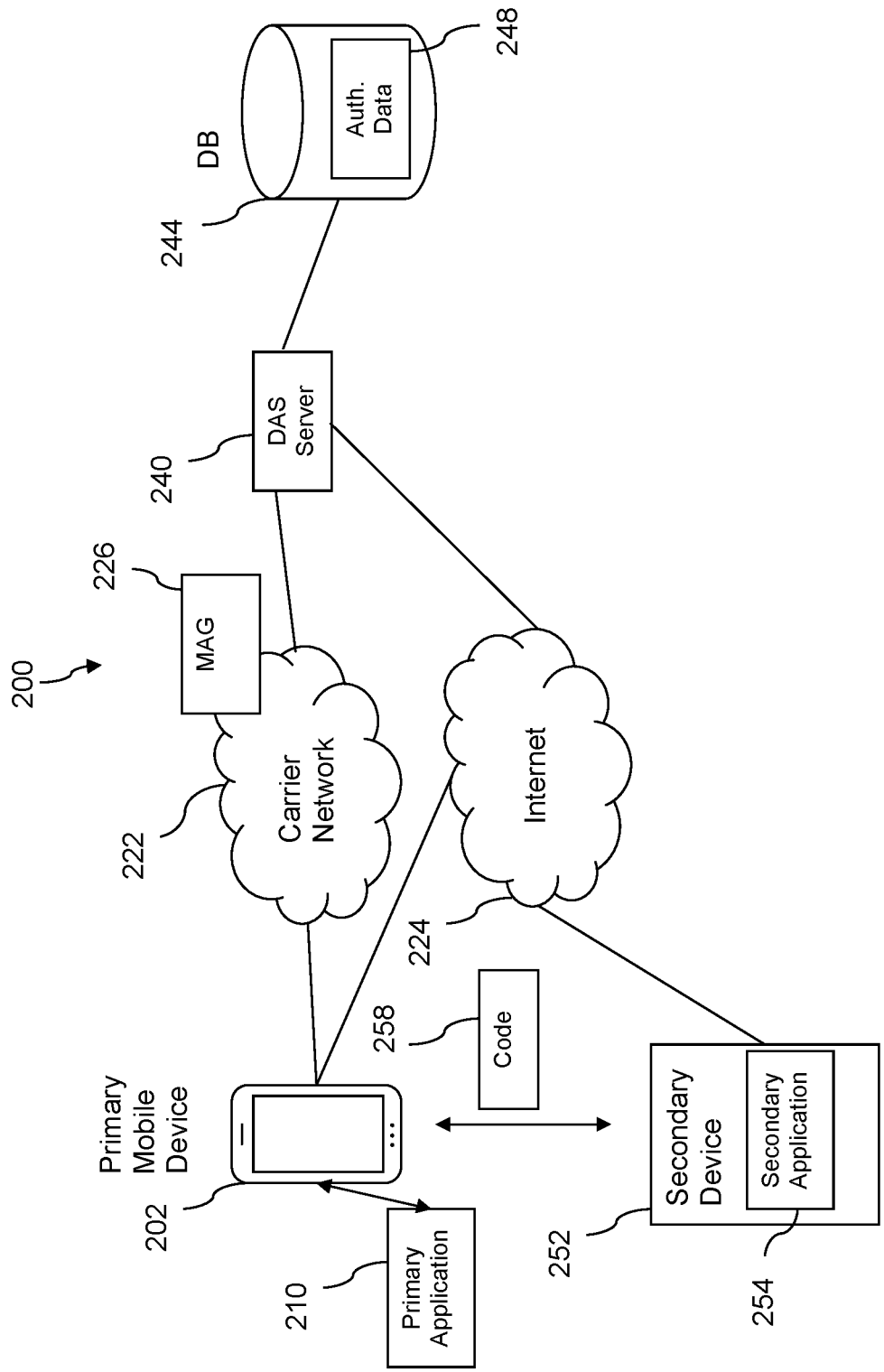
FIG. 2 is a block diagram of another communication system according to an embodiment of the disclosure.

Turning now to FIG. 2, a communication system 200 is described. Communication system 200 may operate in conjunction with, and/or share some components with, communication system 100. For example, communication system 100 as described above can be employed to establish trust with the primary mobile communication device (e.g., mobile communication devices 102) by employing a DAS server 140 and/or DAS server application 142. Communication system 200 can be employed to extend the trust to include a secondary application at a secondary communication 252 device on behalf of the primary mobile communication device.

Communication system 200 includes a primary mobile communication device 202 operable to communicate with a DAS server 240 via a carrier network 222 and/or the Internet 224. The DAS server 240 has access to a database 244. The primary mobile communication device 202 is an example of a mobile communication device 102. The DAS server 240 and database 244 may be substantially similar to DAS sever 140, and data store 144, respectively. The carrier network 222 and the Internet 224 are example networks that can be included in network 122.

As noted with reference to FIG. 1, the primary mobile communication device 202 can establish a trust relationship with the DAS server 240. This may be accomplished, for example, via a MAG authorization process through a MAG 226, an IMSI encryption challenge process, and/or a self-identified IMSI process. The primary mobile communication device 202 can then prove the trust relationship to allow the primary mobile communication device 202 to communicate with application servers. In this way, a data thief cannot attempt to access a user's account without physical access to the primary mobile communication device 202. Communication system 200 can be employed to extend such trust to a secondary application 254 operating on a secondary communication device 252.

The secondary communication device 252 can be a personal computer (PC), laptop PC, tablet PC, PDA, etc. As a particular example, a user may wish to employ a PC with a larger screen and a web browser as a secondary communication device 252 instead of accessing an application completely through a mobile phone acting as a primary mobile communication device 202. As such, the secondary communication device 252 can communicate via the Internet 224, for example via a wired or wireless connection, but may not have direct access to the carrier network 222. The secondary application 254 may be substantially similar to the client application 110, but operates on a different physical device. For example, the secondary application 254 may include a web browser and/or a client side application designed to communicate with corresponding server side application.

The carrier network 222 comprises a radio access network that provides a wireless connection between a mobile phone and the core network. The carrier network 222 includes a MAG 226. The MAG 226 is a gateway communication device that authorizes the primary mobile communication device 202 to interact with the carrier network 222. The MAG 226 maintains awareness of the MDN (e.g., telephone number) and related account information for the primary mobile communication device 202. As noted above, the MAG 226 may act as a proxy for the primary mobile communication device 202 when performing a MAG authorization process in some embodiments.

Once trust has been established with the primary mobile communication device 202, such trust can be extended to the secondary application 254 and/or the secondary communication device 252. Trust can be extended upon verifying a physical nexus between the primary mobile communication device 202 and the secondary communication device 252. A physical nexus indicates that two devices are in physical proximity and/or controlled by the same user. For example, an authorization code 258 can be exchanged between the primary mobile communication device 202 and the secondary communication device 252, or vice versa, to establish the physical nexus. In some examples, the authorization code 258 is a quick response (QR) code. In other examples, the authorization code 258 is a character based code (e.g., including letters, numbers, and/or symbols).

In one example, the secondary application 254 on the secondary communication device 252 can send a request to the DAS server 240 to extend trust. The DAS server 240 can generate an authorization code 258 and store the code 258 as authorization data 248 in the database 244. The authorization data 248 includes data indicating a device's permissions to access devices and/or services in the network. The DAS server 240 can forward the authorization code 258 to the secondary application 254 for display on the secondary communication device 252. As a particular example, when the authorization code 258 is a QR code, a camera on the primary mobile communication device 202 can be employed to take an image of the authorization code 258. A primary application 210, which may implement a client application 110, can control the camera and return the authorization code 258 to the DAS server 240 in order to prove the physical nexus. The DAS server 240 can compare the authorization code 258 from the primary application 210 with the authorization code 258 stored in the authorization data 248. The DAS server 240 can then extend trust to the secondary application 254 and/or the secondary communication device 252 on behalf of the primary mobile communication device 202 based on proof of physical nexus/proximity. For example, the DAS server 240 can forward an access token to the secondary application 254 and/or the secondary communication device 252 to allow for direct communication with a server application on behalf of the primary application 210 and/or primary mobile communication device 202. The access token can also be stored as authorization data 248 in the database 244 and/or forwarded to the relevant server application. While the forgoing is described in terms of a QR code, the authorization code 258 can be any data item securely transferred between the primary mobile communication device 202 and the secondary communication device 252 (e.g., via an exchange outside of a network) to prove physical proximity and/or trust.

In another example, the primary mobile communication device 202 is a feature phone. In such a case, the primary mobile communication device 202 may not be equipped to manage QR codes, for example due to lack of a camera, lack of program support for reading QR codes, etc. In such a case, the primary mobile communication device 202 can request the authorization code 258 via a WAP based request. The MAG 226 can proxy the primary mobile communication device 202, for example by inserting the MDN of the primary mobile communication device 202 into the request. The DAS server 240 can generate an authorization code 258 based on the MDN of the primary mobile communication device 202. The DAS server 240 can also insert the authorization code 258 into a WAP page and forward the WAP page back to the primary application 210 for display on the primary mobile communication device 202.

The user can launch the secondary application 254 on the secondary communication device 252. The secondary application 254 can receive the authorization code 258 (e.g., the code is keyed into the secondary device 252 by the user) along with the MDN of the primary mobile communication device 202 and forward such information back to the DAS server 240. The DAS server 240 can verify that the authorization code 258 received from the secondary application 254 matches the authorization code 258 generated based on the MDN to establish a physical nexus between the primary mobile communication device 202 and the secondary communication device 252. The DAS server 240 can also extend trust to the secondary application 254 and/or the secondary communication device 252 by forwarding an access token to the secondary application 254 and/or the secondary communication device 252 to allow for direct communication with a server application on behalf of the primary application 210 and/or primary mobile communication device 202. The access token can also be stored as authorization data 248 in the database 244 and/or forwarded to the relevant server application.

The forgoing allows a user to extend trust from a primary mobile communication device 202 to a secondary communication device 252. The secondary communication device 252 may inherit the trust level of the primary mobile communication device 202. For example, an account owner (AO) could transfer account owner trust to a secondary communication device 252, and a device user (DU) could transfer device user trust to a secondary communication device 252. This approach allows a user to employ a device other than a cell phone to manage and/or monitor a cell phone account via the Internet 224 in a communication system 200 that employs proof of device trust for account access.

The preceding describes the general mechanisms for extending trust from a primary mobile communication device 202 to a secondary communication device 252 (and/or associated applications). The following FIGs describe such example mechanisms in greater detail.

Figure 3:
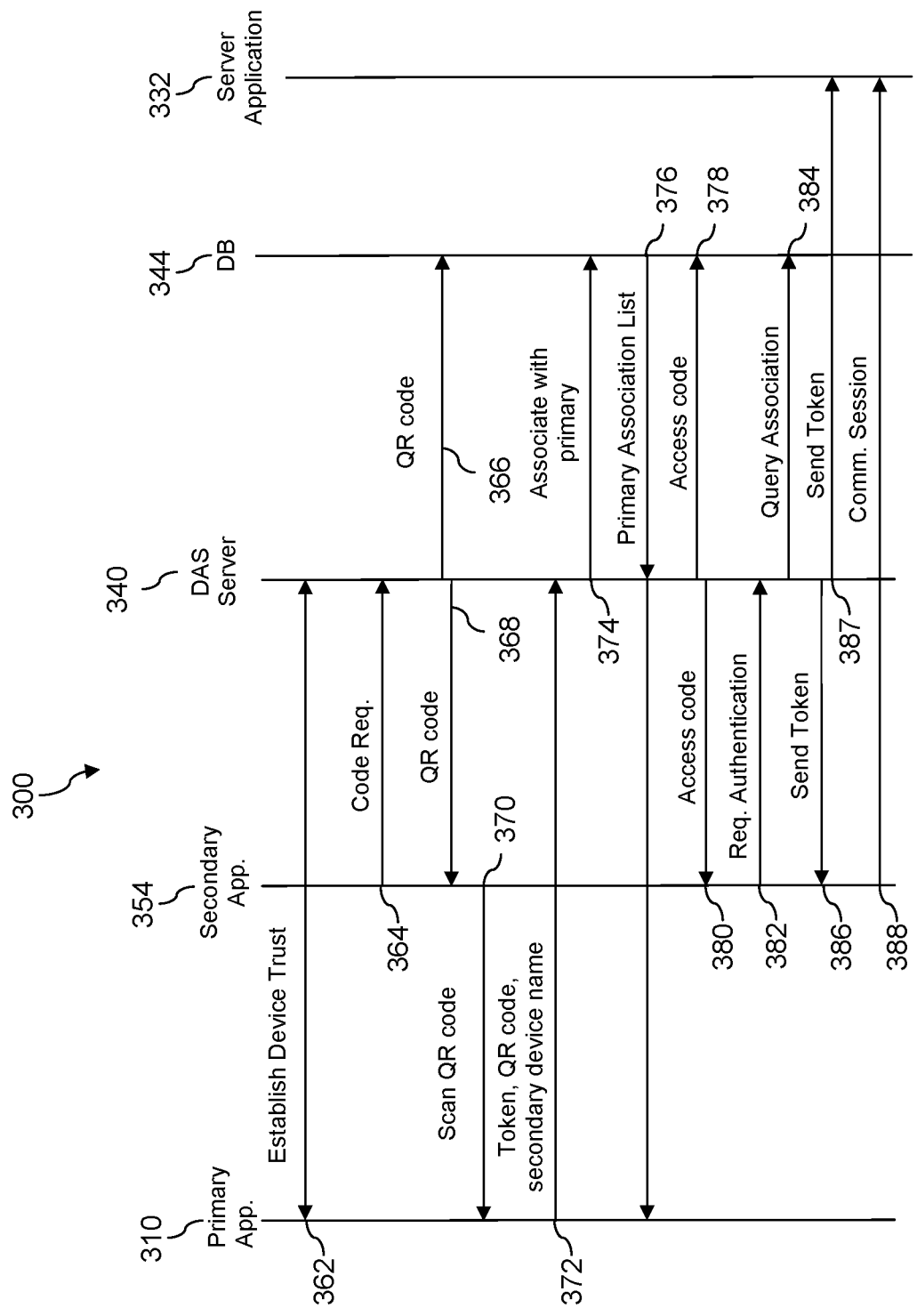
FIG. 3 is a message sequence diagram according to an embodiment of the disclosure.

FIG. 3 is a message sequence diagram 300 according to an embodiment of the disclosure. The message sequence diagram 300 operates on components from system 100, system 200, or combinations thereof. As shown, messages are exchanged between a primary application 310 operating in a primary mobile communication device, a secondary application 354 operating on a secondary communication device, a DAS server 340, a database 344, and a server application 332, which may be substantially similar to the primary application 210, the secondary application 254, the DAS server 240, the database 244, and the server application 132, respectively.

The message sequence diagram 300 illustrates an example mechanism to extend a trust relationship with a primary mobile communication device to a secondary communication device. Hence, the mechanism first establishes device trust 362 between the DAS server 340 and the primary application 310. Establishing device trust 362 may include performing a MAG authorization process, an IMSI encryption challenge process, a self-identified IMSI process, or combinations thereof as discussed with respect to FIG. 1. Establishing device trust 362 may result in the DAS server 340 generating an access token, communicating the access token to a server application 332, storing the access token in the database 344, and forwarding the access token to the primary application 310. For clarity of discussion, the access token for the primary mobile communication device is referred to herein as a primary token.

The secondary application 354 is launched at the secondary communication device. Further, the secondary application 354 transmits a code request 364 to the DAS server 340. For example, the secondary application 354 can employ a hypertext transfer protocol (HTTP) POST request to make a code request 364 for an authorization code, such as a QR code. The code request 364 may also push an identification token generated by the secondary application 354 toward the DAS server 340 for identification purposes. The DAS server 340 responds to the code request 364 by generating the authorization code (e.g., authorization code 258).

The DAS server 340 forwards the authorization code 366 to the database 344 for storage as authentication data. This may include a request to cache the authorization code 366 along with the identification token from the secondary application 354. The authorization code 368 is also forwarded from the DAS server 340 to the secondary application 354.

The primary application 310 obtains the authorization code 370 from the secondary application 354. For example, the secondary application 354 can display a QR code on a screen of the secondary communication device, and the primary application 310 can activate a camera on the primary mobile communication device to scan the QR code from the secondary communication device. In other examples, the authorization code 370 can be displayed on the screen of the secondary communication device and entered into the primary mobile communication device by the user. The transfer of the authorization code 370 between the primary application 310 and the secondary application 354 proves a physical nexus between the primary mobile communication device and the secondary communication device, which excludes data thieves from accessing the system.

The primary application 310 may also prompt the user in order to obtain a secondary device name for the secondary communication device. The primary application 310 may forward the primary access token, the authorization code, and the secondary device name to the DAS server 340 in an authorization request 372. For example, the preceding items can be forwarded via a HTTP POST request. The DAS server 340 can then validate the primary access token to ensure the primary application 310 is trusted.

The items from the authorization request 372 can be associated 374 with the primary mobile communication device. For example, the items can be stored in the database 344 in an association list. Such association extends the trust with the primary mobile communication device to include the secondary communication device. For example, the authorization code, the secondary device name, and the identification token from the secondary application 354 can be associated 374 with the primary mobile communication device via an association list 376. The association list 376 from the database 344 can be forwarded to the DAS server 340 and the primary application 310 for display to the user via the primary mobile communication device. This informs the user of the association change, for example by displaying all devices associated with the account as included in the association list 376.

Once trust has been extended, the DAS server 340 can generate a time based access code 378 to provide a time window for obtaining a secondary token to act as an access token for the secondary communication device. The time based access code 378 is cached to the database 344. The time based access code 380 (e.g., a copy of time based access code 378) is also forwarded to the secondary application 354 via an HTTP PUSH request.

The secondary application 354 can employ the time based access code and/or the authorization code to request a secondary token, for example by sending an authentication request message 382. The DAS server 340 can query 384 the association list from the database 344 in order to verify the time based access code and/or the authorization code are associated with the trusted primary application 310. Upon validating the time based access code, the DAS server 340 can generate a secondary token 386 for use as an access token by the secondary application 354. The secondary token 386 is sent from the DAS server 340 to the secondary application 354. The secondary token 387 (a copy of secondary token 386) may also be sent to the server application 332. It should be noted that the secondary token 386 may have an expiration date and/or a time-to-live. Hence, the secondary token 386 can be re-obtained upon expiration for continued access.

The secondary application 354 can employ the secondary token 386 to prove trust to the server application 332. Hence, the secondary application 354 uses the secondary token 386 as an access token to create a communication session 388 between the secondary application 354 and the server application 332 on behalf of the primary application 310/primary mobile communication device.

Figure 4:
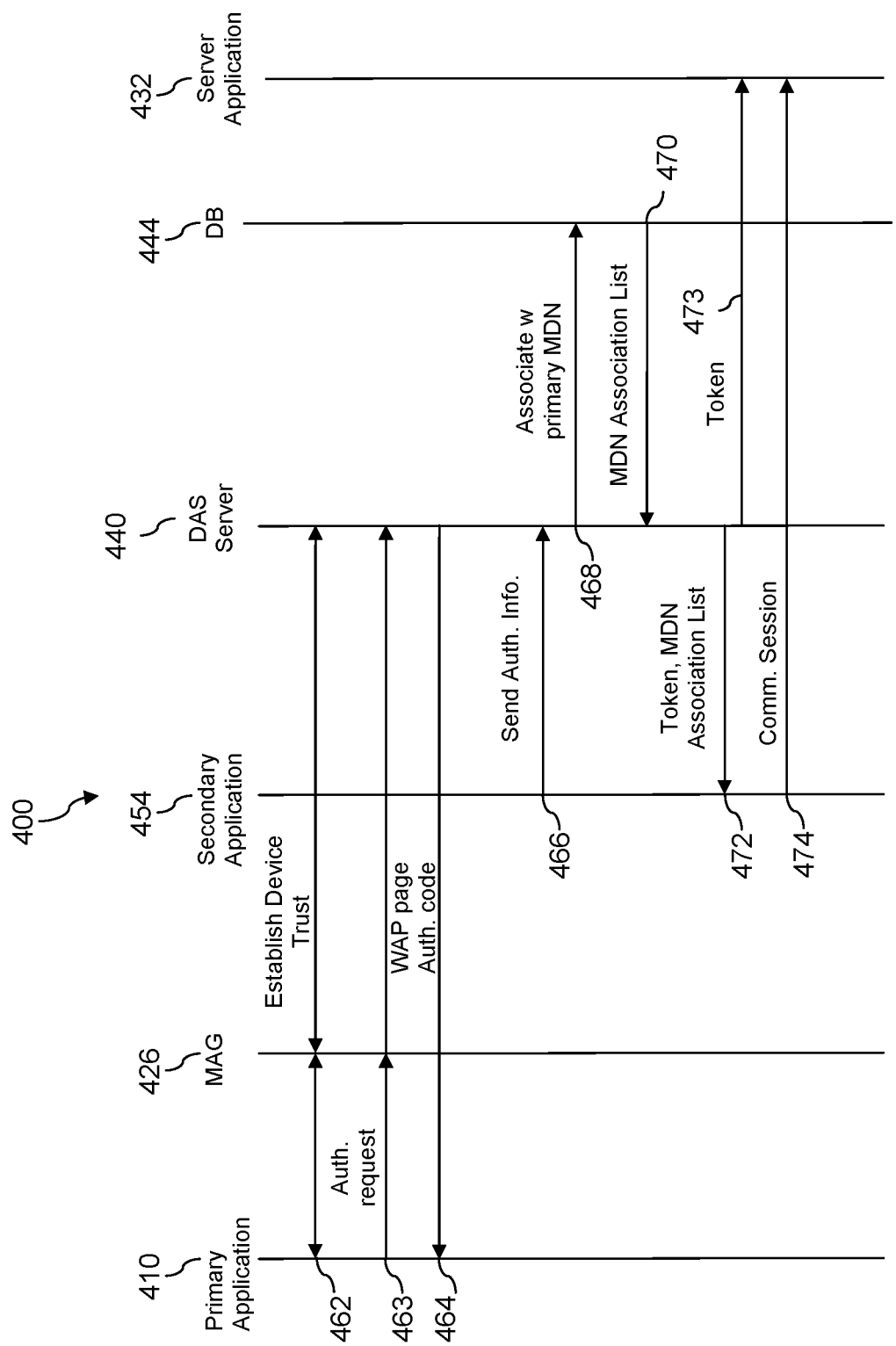
FIG. 4 is another message sequence diagram according to an embodiment of the disclosure.

FIG. 4 is another message sequence diagram 400 according to an embodiment of the disclosure. The message sequence diagram 400 operates on components from system 100, system 200, or combinations thereof. As shown, messages are exchanged between a primary application 410 operating in a primary mobile communication device (e.g., a feature phone), a secondary application 454 operating on a secondary communication device, a MAG 426, a DAS server 440, a database 444, and a server application 432, which may be substantially similar to the primary application 210, the secondary application 254, the MAG 226, the DAS server 240, the database 244, and the server application 132, respectively.

The message sequence diagram 400 illustrates an example mechanism to extend a trust relationship with a primary mobile communication device to a secondary communication device. In this example, the primary application 410 may operate on a feature phone with limited functionality. For example, the primary mobile communication device may not contain a camera, may be limited to WAP based communication, etc. The primary application 410 establishes device trust 462, for example by performing a MAG authorization process, an IMSI encryption challenge process, a self-identified IMSI process, or combinations thereof.

As noted above, some feature phones may be unable to perform certain of these trust establishment processes. However, the remainder of message sequence diagram 400 is agnostic to the initial trust establishment process. Hence, the method described by the message sequence diagram 400 may establish device trust 462 by any trust establishment process, and is limited only by the particular primary mobile communication device used for a corresponding example.

The primary application 410 sends an authorization request message 463 for a secondary application 454 operating on a secondary communication device. For example, a user my select a WAP based authorization link in the primary application 410. The primary application 410 may then send a GET user discovery wrapper message toward the MAG 426, which is proxied by the MAG 426 and forwarded to the DAS server 440. The MAG 426 may proxy the primary application 410 by acting as a source for the GET user discovery wrapper message sent to the DAS server 440. Further, the MAG 426 may insert the MDN of the primary mobile communication device in the authorization request message 463. For example, the MAG 426 can insert an encrypted MDN header in the GET user discovery wrapper message in order to securely provide the MDN, or portions and/or hash values thereof, to the DAS server 440.

The DAS server 440 generates a time based authorization code 464 (e.g., authorization code 258) based on the MDN header. The DAS server 440 then forwards the authorization code 464 to the primary application 410, for example via a WAP page containing the authorization code 464 and sent in response to the GET user discovery wrapper message. The time based authorization code 464 may be a temporary character based value that expires (e.g., after twenty minutes) in order to limit exposure to any third party that may intercept the code in transit. For example, a data thief would have difficulty obtaining the relevant information to use an intercepted time based authorization code 464 before expiration.

The user launches the secondary application 454 on the secondary communication device. The secondary application 454 obtains the authorization code 464, the MDN for the primary mobile communication device, and/or a secondary device name for the secondary communication device from the user. The secondary application 454 then sends authorization information 466 the authorization code, the MDN (e.g., as an MDN header), and the secondary device name to the DAS server 440, for example via an HTTP POST message. By transferring the authorization code between the primary mobile communication device and the secondary communication device, a physical nexus is shown to the DAS server 440. Hence, the DAS server 440 can extend trust to the secondary communication device on behalf of the primary mobile communication device.

The DAS server 440 generates validation authorization code based on the MDN from the secondary application 454. The DAS server 440 then compares the validation authorization code with the authorization code received from the secondary application 454. If the authorization codes match, the received authorization code has been successfully transferred between devices. Accordingly, the DAS server 440 generates a secondary token to be used as an access token for the secondary application 454. The DAS server 440 then associates the MDN, the secondary device name, and the secondary token with the primary mobile communication device via an association list 468 in the database 444.

The database 444 returns the association list 470 (a copy of association list 468) for the MDN in order to confirm that the association has been updated to include the secondary communication device. The DAS server 440 can then forward the association list for the MDN as well as the secondary token 472 to the secondary communication device. The DAS server may also forward the secondary token 473 (a copy of secondary token 472 to the server application 432.

The secondary application 454 can display the devices included on the association list to indicate that the secondary communication device has been added as a trusted device. The secondary application 454 can also initiate a communication session 474 with the server application 432 by sending the secondary token 472 to the server application 432 in order to prove that trust has been extended to the secondary communication device.

As noted above, message sequence diagrams 300 and 400 may employ a primary token, a secondary token, or both, where a primary token acts as an access token for the primary mobile communication device and a secondary token acts as an access token for the secondary communication device. The primary token for the primary mobile communication device is an encrypted package that may include an MDN and a device serial number for the primary mobile communication device, a timestamp indicating time of issuance, a primary flag set to true indicating the primary mobile communication device is a primary device on a user account, and a label indicating a device name for the primary mobile communication device and/or indicating the user account. The secondary token for the secondary communication device is an encrypted package that may include an MDN and a device serial number for the primary mobile communication device, a timestamp indicating time of issuance, a primary flag set to false indicating the secondary communication device is not a primary device on a user account, and a label indicating a device name for the secondary communication device and/or indicating the user account.

The token packages of the primary and secondary devices may be encrypted by the DAS server with a key that is seeded by the serial number of the primary trusted device. In order to access the APIs of the server application, the relevant application should provide the encrypted token as well as the MDN of the primary device as a header. The server application uses the MDN as a subscriber information query request to determine the primary mobile communication device serial number. The device serial number can be used to decrypt the token payload. After the contents of the encrypted payload are validated, the relevant application is allowed access to the service of the API.

Figure 5:
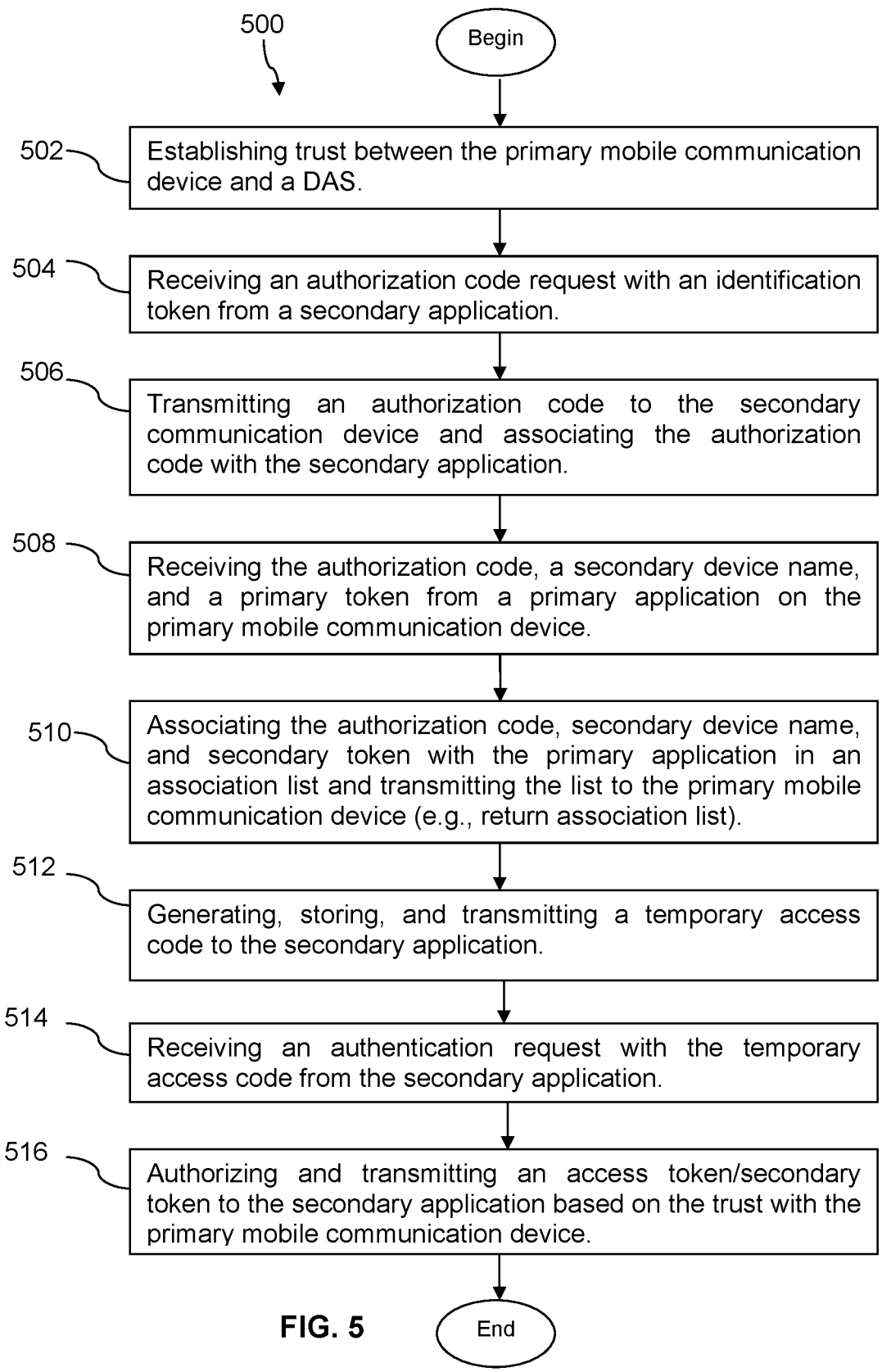
FIG. 5 is a flow chart of a method according to an embodiment of the disclosure.

FIG. 5 is a flow chart of a method 500 according to an embodiment of the disclosure. Method 500 is a mechanism of authenticating a secondary communication device based on authentication of a primary mobile communication device, and thus extending a trust relationship with a primary mobile communication device to a secondary communication device (e.g., as discussed in message sequence diagram 300). Specifically, method 500 is discussed from the perspective of a DAS server, such as DAS server 140, 240, and/or 340. Method 500 may also communicate with other components from system 100, system 200, and/or message sequence diagram 300, and hence detail from those sections may be employed to further clarify method 500 as desired.

Method 500 may operate on a DAS server including a processor, a transceiver, a non-transitory memory, etc. as described herein. For example, method 500 may operate by storing a DAS server application (e.g., DAS server application 142) in memory and executing such application by the processor. At step 502, the DAS server establishes trust with the primary mobile communication device. Such trust can be established with the primary mobile communication device by performing a MAG authentication process, an IMSI encryption challenge, and/or a self-identified IMSI process as discussed with respect to FIG. 1.

At step 504, the DAS server receives an authorization code request from a secondary application operating on the secondary communication device. The authorization code request may include an identification token from the secondary application. Accordingly, the DAS server can associate the authorization code with the identification token from the secondary application in memory, for example by employing a database and/or a data store.

At step 506, an authorization code is transmitted to the secondary communication device in response to the authorization code request of step 504. In some examples, the authorization code is a QR code. The authorization code may also be stored/cached in memory and/or a database.

At step 508, the authorization code is received (at the DAS server) from a primary application operating on the primary mobile communication device. Receiving the authorization code from the primary application in response to transmitting the authorization code to the secondary application indicates a physical nexus between the primary mobile communication device and the secondary communication device. Hence, trust can be extended to the secondary communication device and secondary application on behalf of the primary application/primary mobile communication device. This is because a data thief is unlikely to maintain control of both devices. The DAS may also receive a secondary device name and primary token from the primary application on the primary mobile communication device along with the authorization code. The primary token evidences the established trust with the primary mobile communication device, and hence proves that the authorization code was not intercepted by some third party device. The secondary device name indicates a label for the secondary communication device. In some examples, the primary token from the primary application on the primary mobile communication device includes an MDN (or sub-portions thereof) of the primary mobile communication device, a device serial number of the primary mobile communication device, a timestamp, a primary flag set to true (to indicate the device is primary for the account), and a label indicating a device name for the primary mobile communication device (and/or the user account).

At step 510, the secondary device name, the authorization code, and the secondary token are associated with the primary application in memory by including such items in an association list for the primary application/primary mobile communication device. The updated association list may be returned to the primary application at the primary mobile communication device to evidence trust establishment with the secondary communication device.

At step 512, a temporary access code (e.g., a time based access code) is generated for the secondary application. The temporary access code is stored in memory, for example in the association list. Further, the temporary access code is transmitted to the secondary application on the secondary communication device. The temporary access code can be used by the secondary application to gain authorization to receive an access token.

At step 514, an authentication request is received from the secondary application on the secondary communication device. The authentication request includes the temporary access code and the authorization code. The authentication request is employed to authorize the secondary application based on the trust with the primary mobile communication device.

At step 516, the secondary application is authorized based on the trust with the primary mobile communication device and the authorization code from the primary application. Accordingly, a secondary token is transmitted to act as an access token for the secondary application at the secondary communication device. This allows the secondary communication device to initialize a communication session from the secondary application to a server application on behalf of the primary mobile communication device. In some examples, the secondary token transmitted to the secondary application may include an MDN of the primary mobile communication device (or sub-portion thereof), a device serial number of the primary mobile communication device, a timestamp, a primary flag set to false (to indicate the decide is a secondary device), a QR code value, and a label indicating the device name of the secondary communication device (and/or the user account).

Figure 6:
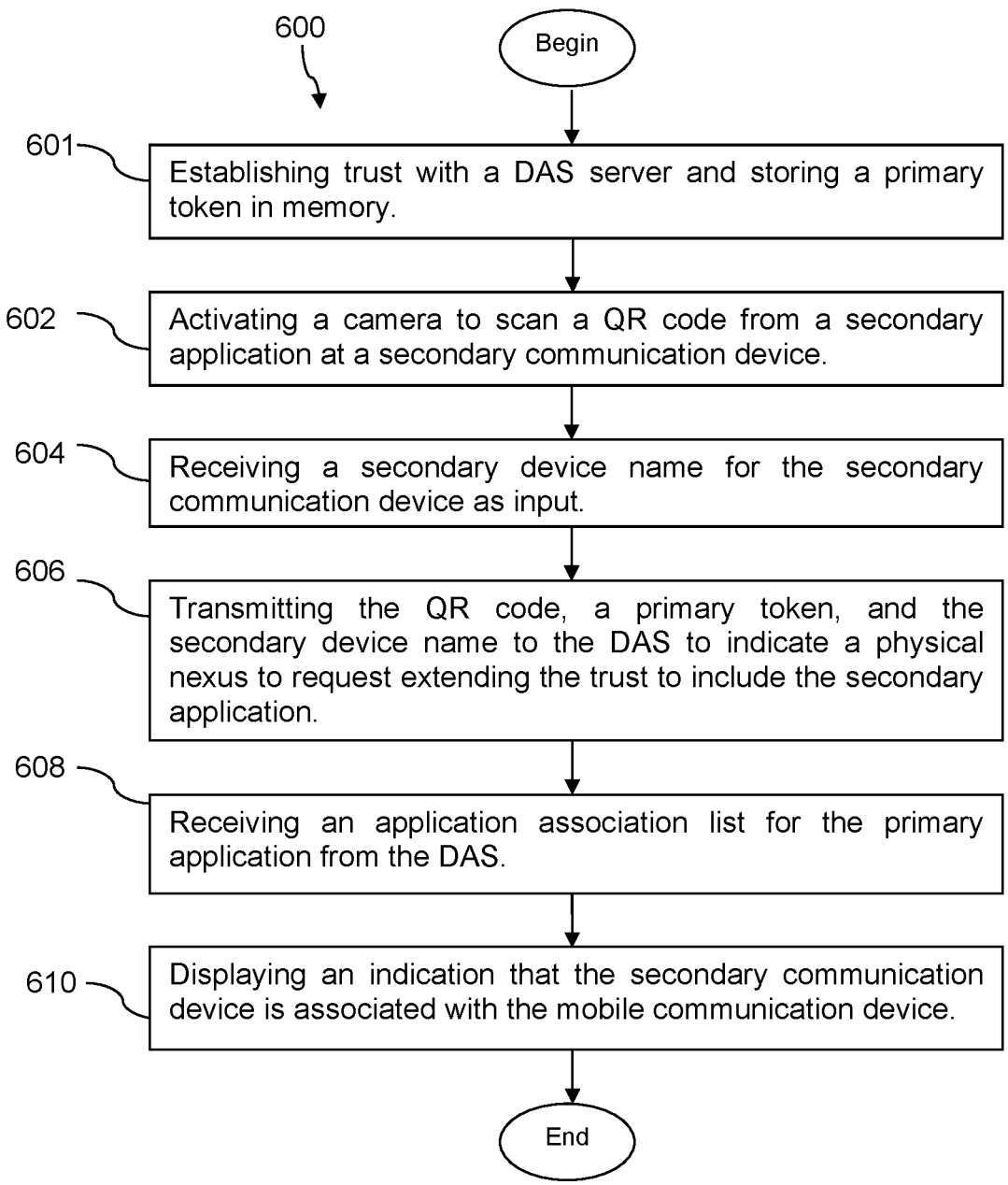
FIG. 6 is a flow chart of another method according to an embodiment of the disclosure.

FIG. 6 is a flow chart of another method 600 according to an embodiment of the disclosure. Method 600 is a mechanism of authenticating a secondary communication device based on authentication of a primary mobile communication device, and thus extending a trust relationship with a primary mobile communication device to a secondary communication device (e.g., as discussed in message sequence diagram 300). Specifically, method 600 is discussed from the perspective of a primary mobile communication device, such as mobile communication devices 102 and/or primary mobile communication device 202. Method 600 may also communicate with other components from system 100, system 200, message sequence diagram 300 and/or method 500, and hence detail from those sections may be employed to further clarify method 600 as desired.

Method 600 may operate on a primary mobile communication device including a processor, a camera, a transceiver, a display, a non-transitory memory, etc. as described herein. For example, method 600 may operate by storing a primary application in memory and executing such application by the processor. At step 601, the primary application establishes trust with a DAS server. This may occur by employing performing a MAG authorization process, an IMSI encryption challenge process, a self-identified IMSI process, or combinations thereof as discussed with respect to FIG. 1. Upon completion of the trust establishment process, a primary token is received and stored in memory. The primary token indicates the trust established between the primary mobile communication device and the DAS server. The primary token stored in memory may include an MDN (or sub-portions thereof) of the primary mobile communication device, a device serial number of the primary mobile communication device, a timestamp, a primary flag set to true (to indicate the device is a primary device for the user account), and a label indicating the primary mobile communication device and/or the user account.

At step 602, the camera of the primary mobile communication device is activated to scan a QR code from a secondary application at the secondary communication device. This transfer of the QR code evidences a physical nexus between the primary mobile communication device and at the secondary communication device, and hence indicates that trust can be extended to the secondary communication device.

At step 604, the primary application may prompt the user and receive a secondary device name for the secondary communication device as input after scanning the QR code.

At step 606, the primary application transmits, via the transceiver, the QR code and the primary token to the DAS to indicate a physical nexus between the primary mobile communication device and the secondary communication device and to request extending the trust to include the secondary application at the secondary communication device on behalf of the primary mobile communication device. The primary application can also transmit the secondary device name to the DAS server along with the QR code and the primary token to assist in labeling the secondary communication device.

At step 608, the primary application may receive, via the transceiver, an application association list for the primary application from the DAS server. The application association list indicates the secondary communication device is associated with the mobile communication device.

At step 610, the primary application can display, via the display, an indication that the secondary communication device is associated with the primary mobile communication device and/or the user account.

Figure 7:
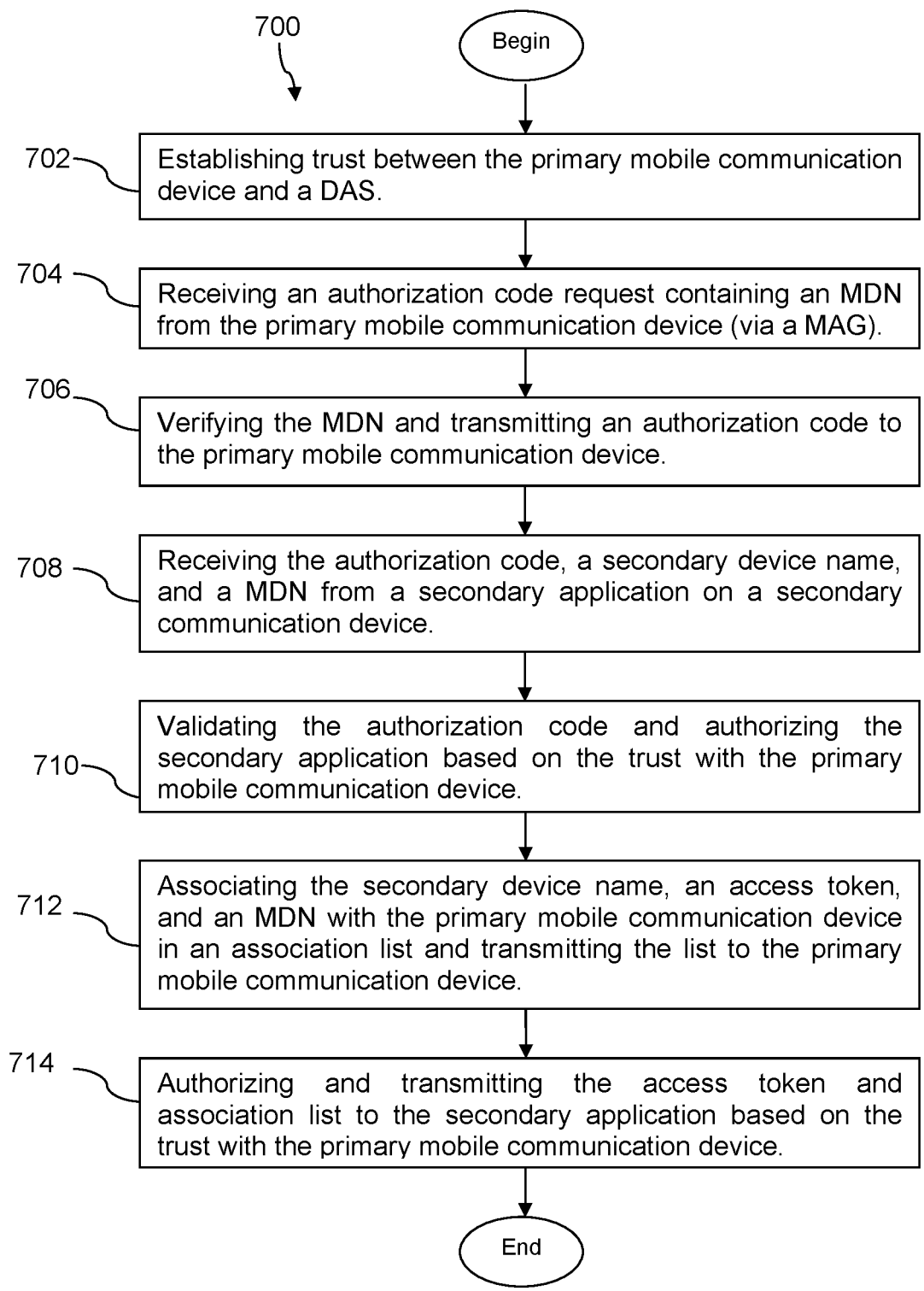
FIG. 7 is a flow chart of another method according to an embodiment of the disclosure.

FIG. 7 is a flow chart of another method 700 according to an embodiment of the disclosure. Method 700 is a mechanism of authenticating a secondary communication device based on authentication of a primary mobile communication device, and thus extending a trust relationship with a primary mobile communication device to a secondary communication device (e.g., as discussed in message sequence diagram 400). Specifically, method 700 is discussed from the perspective of a DAS server, such as DAS server 140, 240, and/or 340, for example when communicating with a feature phone. Method 700 may also communicate with other components from system 100, system 200, and/or message sequence diagram 400, and hence detail from those sections may be employed to further clarify method 700 as desired.

Method 700 may operate on a DAS server including a processor, a transceiver, a non-transitory memory, etc. as described herein. For example, method 700 may operate by storing a DAS server application (e.g., DAS server application 142) in memory and executing such application by the processor. At step 702, the DAS server establishes trust with the primary mobile communication device. Such trust can be established with the primary mobile communication device by performing a MAG authentication process, an IMSI encryption challenge, and/or a self-identified IMSI process as discussed with respect to FIG. 1.

At step 704, an authorization code request is received from the primary mobile communication device via a MAG. The authorization code request may include an MDN of the primary mobile communication device inserted into the authorization code request by the MAG (e.g., the MAG acting as a proxy for the primary mobile communication device). The authorization code request may be a WAP based request.

At step 706, the MDN is verified. An authorization code is then generated after verification of the MDN of the primary mobile communication device. The authorization code may be a time based access code. The authorization code is transmitted to the primary mobile communication device in response to the authorization code request. The authorization code may be transmitted to the primary mobile communication device as part of a WAP page for display.

At step 708, the authorization code is received from a secondary application operating on the secondary communication device. Receipt of the authorization code from the secondary application indicates a physical nexus between the primary mobile communication device and the secondary communication device, and hence trust can be extended to the secondary application. The MDN of the primary mobile communication device and a secondary device name may also be received from the secondary application along with the authorization code from the secondary application.

At step 710, the authorization code from the secondary application on the secondary communication device is validated. This authorizes the secondary application based on the trust with the primary mobile communication device and the authorization code from the secondary application.

At step 712, the secondary device name, the access token for the secondary application, and the MDN of the primary mobile communication device may be associated in an MDN association list and stored in a memory/database.

At step 714, an access token is transmitted to the secondary application at the secondary communication device to allow initialization of a communication session from the secondary application on behalf of the primary mobile communication device. The access token may be transmitted to the secondary application at the secondary communication device as part of the MDN association list. The access token transmitted to the secondary application may include the MDN of the primary mobile communication device, a device serial number of the primary mobile communication device, a timestamp, a primary flag set to false indicating the secondary communication device is not a primary device on a user account, and a label indicating the device name of the secondary communication device and/or the user account name.

Figure 8:
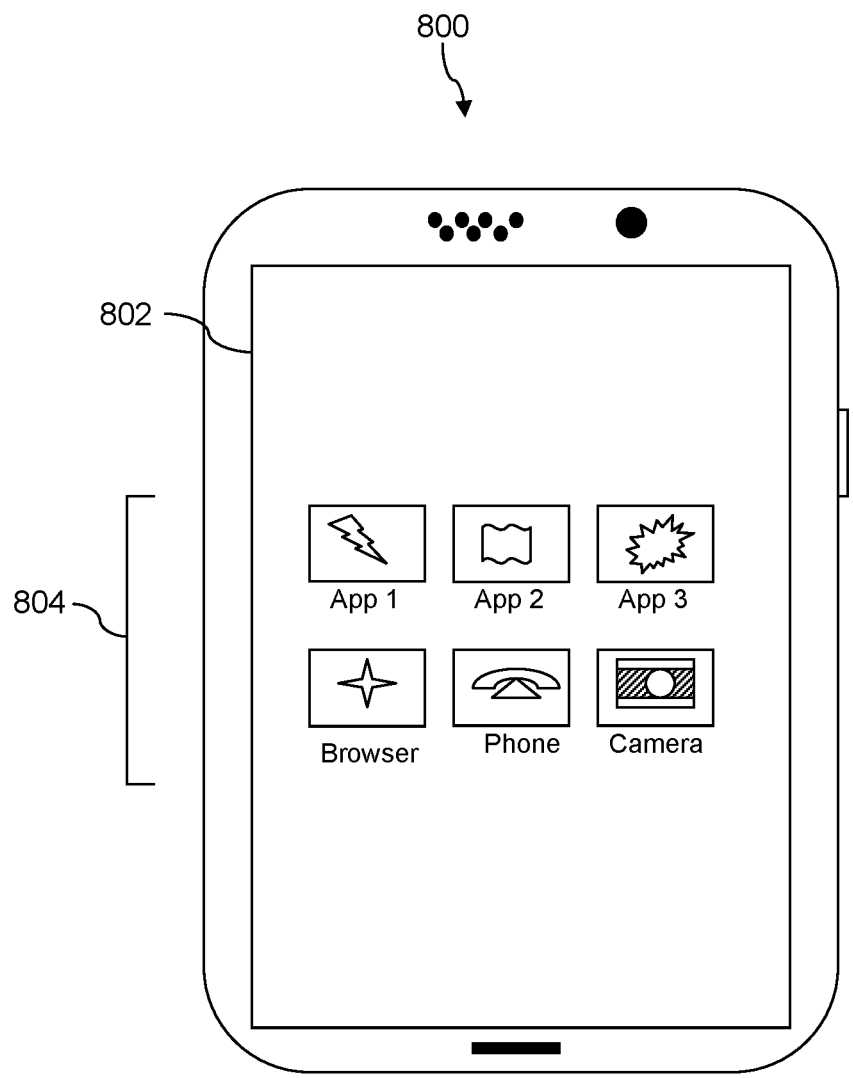
FIG. 8 depicts an example user equipment (UE), which is operable for implementing aspects of the present disclosure.

FIG. 8 depicts an example user equipment (UE) 800, which is operable for implementing aspects of the present disclosure, but the present disclosure should not be limited to these implementations. Though illustrated as a mobile phone, the UE 800 may take various forms including a wireless handset, a pager, a personal digital assistant (PDA), a gaming device, or a media player. The UE 800 includes a touchscreen display 802 having a touch-sensitive surface for input by a user. A small number of application icons 804 are illustrated within the touch screen display 802. It is understood that in different embodiments, any number of application icons 804 may be presented in the touch screen display 802. In some embodiments of the UE 800, a user may be able to download and install additional applications on the UE 800, and an icon associated with such downloaded and installed applications may be added to the touch screen display 802 or to an alternative screen. The UE 800 may have other components such as electro-mechanical switches, speakers, camera lenses, microphones, input and/or output connectors, and other components as are well known in the art. The UE 800 may present options for the user to select, controls for the user to actuate, and/or cursors or other indicators for the user to direct. The UE 800 may further accept data entry from the user, including numbers to dial or various parameter values for configuring the operation of the handset. The UE 800 may further execute one or more software or firmware applications in response to user commands. These applications may configure the UE 800 to perform various customized functions in response to user interaction. Additionally, the UE 800 may be programmed and/or configured over-the-air, for example from a wireless base station, a wireless access point, or a peer UE 800. The UE 800 may execute a web browser application which enables the touch screen display 802 to show a web page. The web page may be obtained via wireless communications with a base transceiver station, a wireless network access node, a peer UE 800 or any other wireless communication network or system.

Figure 9:
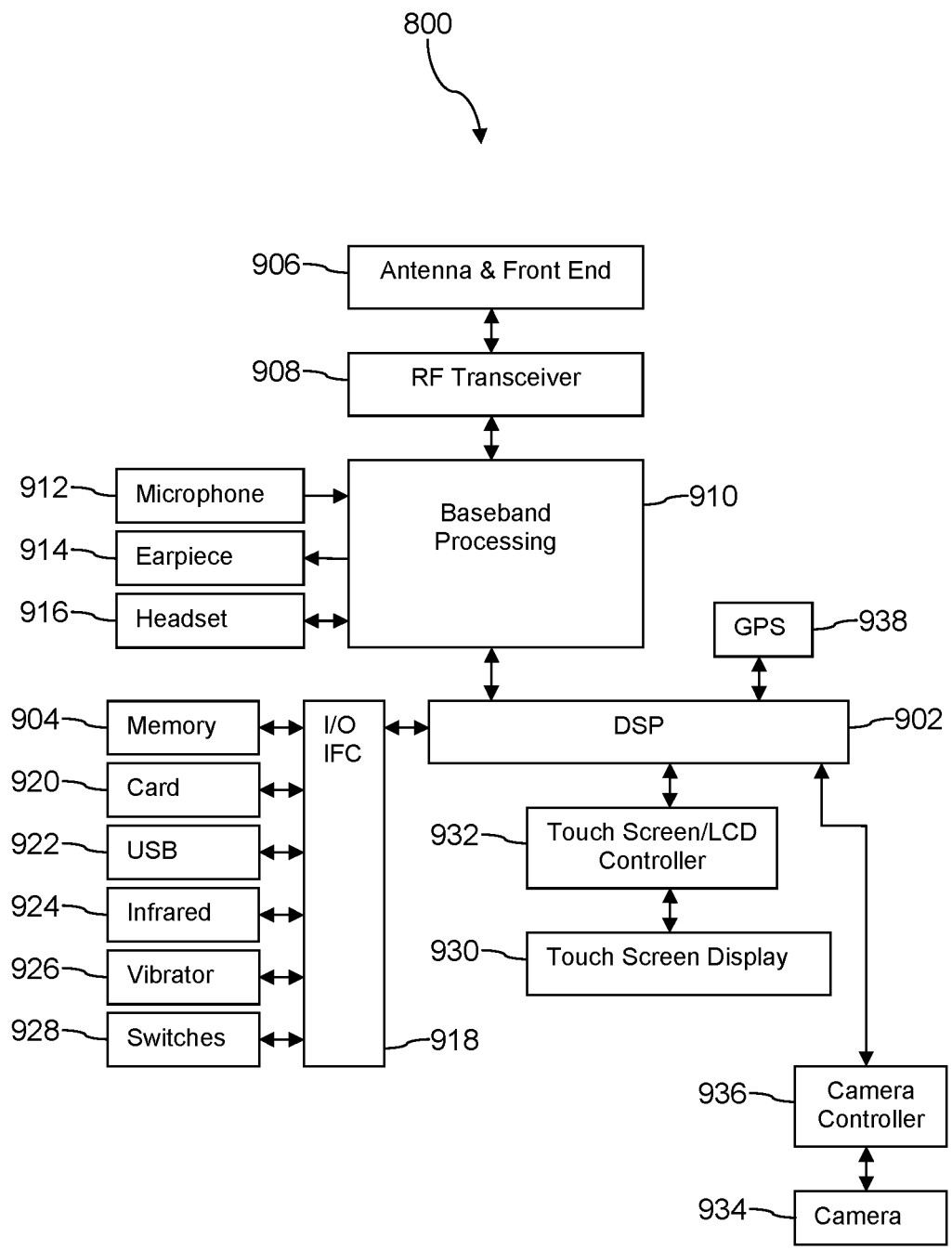
FIG. 9 is a block diagram of a hardware architecture of a mobile communication device according to an embodiment of the disclosure.

FIG. 9 shows a block diagram of the UE 800. While a variety of known components of handsets are depicted, in an embodiment a subset of the listed components and/or additional components not listed may be included in the UE 800. The UE 800 includes a digital signal processor (DSP) 902 and a memory 904. As shown, the UE 800 may further include an antenna and front end unit 906, a radio frequency (RF) transceiver 908, a baseband processing unit 910, a microphone 912, an earpiece speaker 914, a headset port 916, an input/output interface 918, a removable memory card 920, a universal serial bus (USB) port 922, an infrared port 924, a vibrator 926, one or more electro-mechanical switches 928, a touch screen liquid crystal display (LCD) with a touch screen display 930, a touch screen/LCD controller 932, a camera 934, a camera controller 936, and a global positioning system (GPS) receiver 938. In an embodiment, the UE 800 may include another kind of display that does not provide a touch sensitive screen. In an embodiment, the UE 800 may include both the touch screen display 930 and additional display component that does not provide a touch sensitive screen. In an embodiment, the DSP 902 may communicate directly with the memory 904 without passing through the input/output interface 918. Additionally, in an embodiment, the UE 800 may comprise other peripheral devices that provide other functionality.

The DSP 902 or some other form of controller or central processing unit operates to control the various components of the UE 800 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the UE 800 to function as a peripheral device to exchange information with a personal computer or other computer system. The infrared port 924 and other optional ports such as a Bluetooth® interface or an IEEE 802.11 compliant wireless interface may enable the UE 800 to communicate wirelessly with other nearby handsets and/or wireless base stations. In an embodiment, the UE 800 may comprise a near field communication (NFC) transceiver. The NFC transceiver may be used to complete payment transactions with point-of-sale terminals or other communications exchanges. In an embodiment, the UE 800 may comprise a radio frequency identify (RFID) reader and/or writer device.

The switches 928 may couple to the DSP 902 via the input/output interface 918 to provide one mechanism for the user to provide input to the UE 800. Alternatively, one or more of the switches 928 may be coupled to a motherboard of the UE 800 and/or to components of the UE 800 via a different path (e.g., not via the input/output interface 918), for example coupled to a power control circuit (power button) of the UE 800. The touch screen display 930 is another input mechanism, which further displays text and/or graphics to the user. The touch screen LCD controller 932 couples the DSP 902 to the touch screen display 930. The GPS receiver 938 is coupled to the DSP 902 to decode global positioning system signals, thereby enabling the UE 800 to determine its position.

Figure 10A:
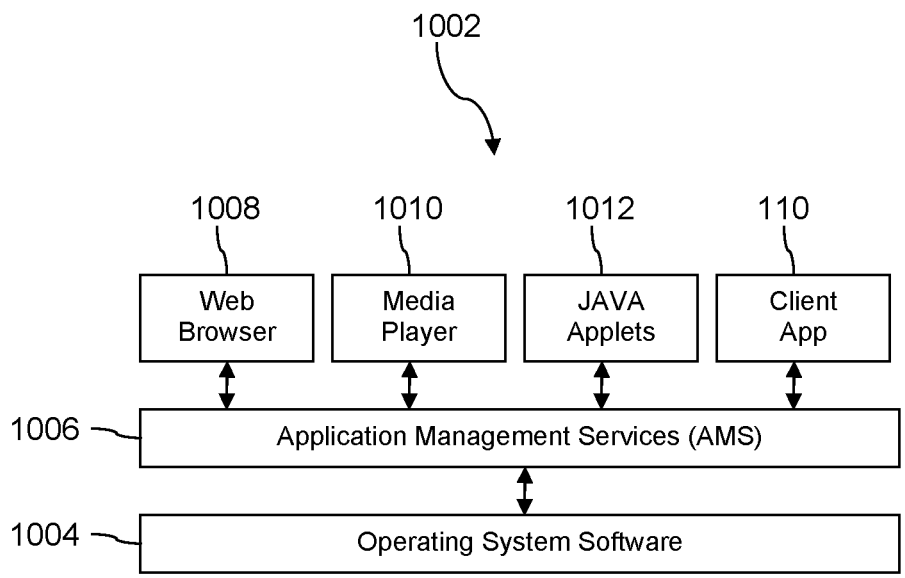
FIG. 10A is a block diagram of a software architecture of a mobile communication device according to an embodiment of the disclosure.

FIG. 10A illustrates a software environment 1002 that may be implemented by the DSP 902. The DSP 902 executes operating system software 1004 that provides a platform from which the rest of the software operates. The operating system software 1004 may provide a variety of drivers for the handset hardware with standardized interfaces that are accessible to application software. The operating system software 1004 may be coupled to and interact with application management services (AMS) 1006 that transfer control between applications running on the UE 800. Also shown in FIG. 10A are a web browser application 1008, a media player application 1010, JAVA applets 1012, and the client application 110 described above with reference to FIG. 1. The web browser application 1008 may be executed by the UE 800 to browse content and/or the Internet, for example when the UE 800 is coupled to a network via a wireless link. The web browser application 1008 may permit a user to enter information into forms and select links to retrieve and view web pages. The media player application 1010 may be executed by the UE 800 to play audio or audiovisual media. The JAVA applets 1012 may be executed by the UE 800 to provide a variety of functionality including games, utilities, and other functionality.

Figure 10B:
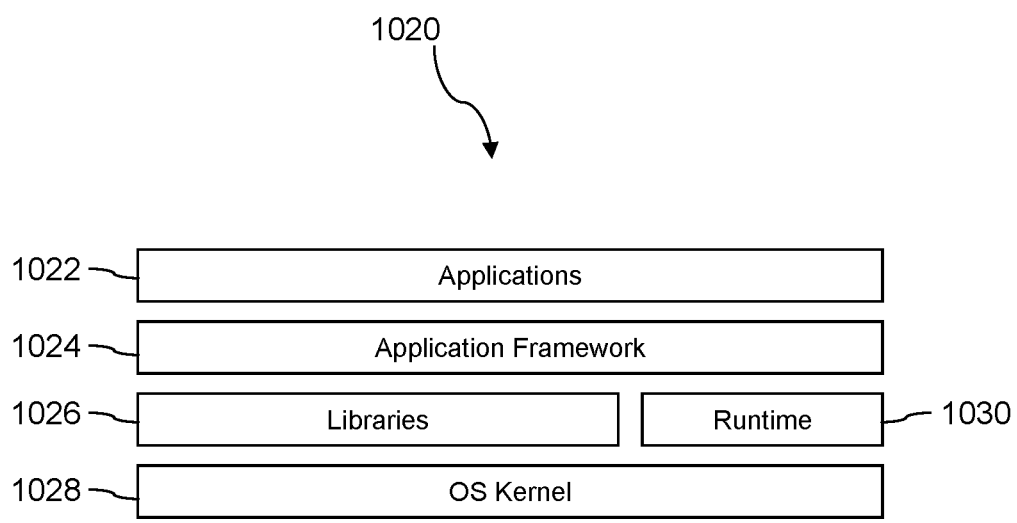
FIG. 10B is a block diagram of another software architecture of a mobile communication device according to an embodiment of the disclosure.

FIG. 10B illustrates an alternative software environment 1020 that may be implemented by the DSP 802. The DSP 802 executes operating system kernel (OS kernel) 1028 and an execution runtime 1030. The DSP 802 executes applications 1022 that may execute in the execution runtime 1030 and may rely upon services provided by the application framework 1024. Applications 1022 and the application framework 1024 may rely upon functionality provided via the libraries 1026.

Figure 11:
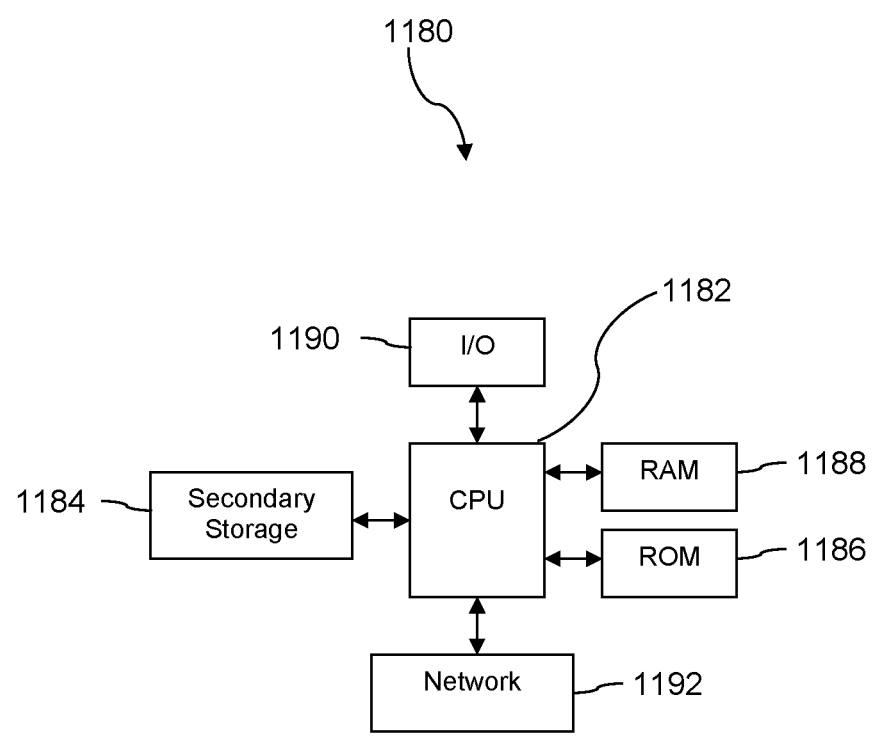
FIG. 11 is a block diagram of a computer system according to an embodiment of the disclosure.

FIG. 11 illustrates a computer system 1180 suitable for implementing one or more embodiments disclosed herein. The computer system 1180 includes a processor 1182 (which may be referred to as a central processor unit or CPU) that is in communication with memory devices including secondary storage 1184, read only memory (ROM) 1186, random access memory (RAM) 1188, input/output (I/O) devices 1190, and network connectivity devices 1192. The processor 1182 may be implemented as one or more CPU chips.

It is understood that by programming and/or loading executable instructions onto the computer system 1180, at least one of the CPU 1182, the RAM 1188, and the ROM 1186 are changed, transforming the computer system 1180 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1180 is turned on or booted, the CPU 1182 may execute a computer program or application. For example, the CPU 1182 may execute software or firmware stored in the ROM 1186 or stored in the RAM 1188. In some cases, on boot and/or when the application is initiated, the CPU 1182 may copy the application or portions of the application from the secondary storage 1184 to the RAM 1188 or to memory space within the CPU 1182 itself, and the CPU 1182 may then execute instructions that the application is comprised of. In some cases, the CPU 1182 may copy the application or portions of the application from memory accessed via the network connectivity devices 1192 or via the I/O devices 1190 to the RAM 1188 or to memory space within the CPU 1182, and the CPU 1182 may then execute instructions that the application is comprised of. During execution, an application may load instructions into the CPU 1182, for example load some of the instructions of the application into a cache of the CPU 1182. In some contexts, an application that is executed may be said to configure the CPU 1182 to do something, e.g., to configure the CPU 1182 to perform the function or functions promoted by the subject application. When the CPU 1182 is configured in this way by the application, the CPU 1182 becomes a specific purpose computer or a specific purpose machine.

The secondary storage 1184 is typically comprised of one or more disk drives or tape drives and is used for non-volatile storage of data and as an over-flow data storage device if RAM 1188 is not large enough to hold all working data. Secondary storage 1184 may be used to store programs which are loaded into RAM 1188 when such programs are selected for execution. The ROM 1186 is used to store instructions and perhaps data which are read during program execution. ROM 1186 is a non-volatile memory device which typically has a small memory capacity relative to the larger memory capacity of secondary storage 1184. The RAM 1188 is used to store volatile data and perhaps to store instructions. Access to both ROM 1186 and RAM 1188 is typically faster than to secondary storage 1184. The secondary storage 1184, the RAM 1188, and/or the ROM 1186 may be referred to in some contexts as computer readable storage media and/or non-transitory computer readable media.

I/O devices 1190 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1192 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 1192 may enable the processor 1182 to communicate with the Internet or one or more intranets. With such a network connection, it is contemplated that the processor 1182 might receive information from the network, or might output information to the network in the course of performing the above-described method steps. Such information, which is often represented as a sequence of instructions to be executed using processor 1182, may be received from and outputted to the network, for example, in the form of a computer data signal embodied in a carrier wave.

Such information, which may include data or instructions to be executed using processor 1182 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1182 executes instructions, codes, computer programs, scripts which it accesses from hard disk, floppy disk, optical disk (these various disk based systems may all be considered secondary storage 1184), flash drive, ROM 1186, RAM 1188, or the network connectivity devices 1192. While only one processor 1182 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1184, for example, hard drives, floppy disks, optical disks, and/or other device, the ROM 1186, and/or the RAM 1188 may be referred to in some contexts as non-transitory instructions and/or non-transitory information.

In an embodiment, the computer system 1180 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1180 to provide the functionality of a number of servers that is not directly bound to the number of computers in the computer system 1180. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1180, at least portions of the contents of the computer program product to the secondary storage 1184, to the ROM 1186, to the RAM 1188, and/or to other non-volatile memory and volatile memory of the computer system 1180. The processor 1182 may process the executable instructions and/or data structures in part by directly accessing the computer program product, for example by reading from a CD-ROM disk inserted into a disk drive peripheral of the computer system 1180. Alternatively, the processor 1182 may process the executable instructions and/or data structures by remotely accessing the computer program product, for example by downloading the executable instructions and/or data structures from a remote server through the network connectivity devices 1192. The computer program product may comprise instructions that promote the loading and/or copying of data, data structures, files, and/or executable instructions to the secondary storage 1184, to the ROM 1186, to the RAM 1188, and/or to other non-volatile memory and volatile memory of the computer system 1180.

In some contexts, the secondary storage 1184, the ROM 1186, and the RAM 1188 may be referred to as a non-transitory computer readable medium or a computer readable storage media. A dynamic RAM embodiment of the RAM 1188, likewise, may be referred to as a non-transitory computer readable medium in that while the dynamic RAM receives electrical power and is operated in accordance with its design, for example during a period of time during which the computer system 1180 is turned on and operational, the dynamic RAM stores information that is written to it. Similarly, the processor 1182 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a secondary communication device based on authentication of a primary mobile communication device, the method comprising:
   establishing trust with the primary mobile communication device by a device authentication server (DAS);
   receiving, by the DAS, an authorization code request from a secondary application operating on the secondary communication device;
   transmitting, by the DAS, an authorization code to the secondary communication device in response to the authorization code request;
   receiving, by the DAS, the authorization code from a primary application operating on the primary mobile communication device;
   authorizing, by the DAS, the secondary application based on the trust with the primary mobile communication device and the authorization code from the primary application; and
   transmitting, by the DAS, a secondary token to the secondary application at the secondary communication device to allow initialization of a communication session from the secondary application.

2. The method of claim 1, wherein the authorization code is a Quick Response (QR) code.

3. The method of claim 1, wherein the authorization code request includes an identification token from the secondary application, and further comprising:
   associating, in memory, the authorization code with the identification token from the secondary application.

4. The method of claim 3, further comprising:
   receiving, by the DAS, a secondary device name and primary token from the primary application on the primary mobile communication device along with the authorization code, the primary token evidencing the established trust with the primary mobile communication device, and the secondary device name indicating the secondary communication device;
   associating, in memory, the secondary device name, the authorization code, and the identification token with the primary application in an association list; and
   transmitting, by the DAS, the association list to the primary application at the primary mobile communication device.

5. The method of claim 4, further comprising:
   generating, by the DAS, a temporary access code for the secondary application;
   storing, in memory, the temporary access code in the association list;

transmitting, by the DAS, the temporary access code to the secondary application on the secondary communication device; and receiving, by the DAS, an authentication request from the secondary application on the secondary communication device, the authentication request including the temporary access code and the authorization code, wherein the authentication request is employed to authorize the secondary application based on the trust with the primary mobile communication device.

6. The method of claim 4, wherein the primary token from the primary application on the primary mobile communication device includes a mobile directory number (MDN) of the primary mobile communication device, a device serial number of the primary mobile communication device, a timestamp, a primary flag set to true, and a label.

7. The method of claim 3, wherein the secondary token transmitted to the secondary application includes a mobile directory number (MDN) of the primary mobile communication device, a device serial number of the primary mobile communication device, a timestamp, a primary flag set to false, a Quick Response (QR) code value, and a label.

8. The method of claim 1, wherein trust is established with the primary mobile communication device by mobile access gateway (MAG) authentication, International Mobile Subscriber Identity (IMSI) encryption challenge, or self-identified IMSI.

* * * * *